United States Patent
Lucas et al.

(10) Patent No.: US 10,535,886 B2
(45) Date of Patent: Jan. 14, 2020

(54) FUEL CELL ASSEMBLY WITH JET PUMP IN THE EXHAUST PATH, AND MOTOR VEHICLE WITH FUEL CELL ASSEMBLY

(71) Applicant: AUDI AKTIENGESELLSCHAFT, Ingolstadt (DE)

(72) Inventors: Christian Lucas, Braunschweig (DE); Natalja Ermatschenko, Wolfsburg (DE)

(73) Assignee: AUDI AKTIENGESELLSCHAFT, Ingolstadt (DE)

( * ) Notice: Subject to any disclaimer, the term of this patent is extended or adjusted under 35 U.S.C. 154(b) by 149 days.

(21) Appl. No.: 14/863,684

(22) Filed: Sep. 24, 2015

(65) Prior Publication Data

US 2016/0093905 A1   Mar. 31, 2016

(30) Foreign Application Priority Data

Sep. 30, 2014   (DE) .................. 10 2014 219 836

(51) Int. Cl.
| | |
|---|---|
| *H01M 8/04* | (2016.01) |
| *H01M 8/04746* | (2016.01) |
| *B60L 11/18* | (2006.01) |
| *H01M 8/06* | (2016.01) |
| *B60L 50/72* | (2019.01) |

(52) U.S. Cl.
CPC ..... *H01M 8/04761* (2013.01); *B60L 11/1883* (2013.01); *B60L 50/72* (2019.02); *H01M 8/06* (2013.01); *H01M 2250/20* (2013.01); *Y02T 90/32* (2013.01); *Y02T 90/34* (2013.01)

(58) Field of Classification Search
None
See application file for complete search history.

(56) References Cited

U.S. PATENT DOCUMENTS

| | | | |
|---|---|---|---|
| 7,560,186 B2 | 7/2009 | Fukuma et al. | |
| 2003/0148167 A1* | 8/2003 | Sugawara | H01M 8/04097 429/415 |
| 2004/0101734 A1 | 5/2004 | Morishima et al. | |
| 2004/0106023 A1* | 6/2004 | Ueda | H01M 8/04388 429/432 |
| 2004/0219406 A1* | 11/2004 | Sugawara | H01M 8/04097 429/432 |
| 2007/0238003 A1 | 10/2007 | Larrain et al. | |

(Continued)

FOREIGN PATENT DOCUMENTS

| | | |
|---|---|---|
| DE | 103 54 907 A1 | 6/2004 |
| JP | 2002-134140 | 5/2002 |

OTHER PUBLICATIONS

Search Report for German Patent Application No. 10 2014 219 836.4, dated Feb. 20, 2015.

*Primary Examiner* — Ula C Ruddock
*Assistant Examiner* — Tony S Chuo
(74) *Attorney, Agent, or Firm* — Pearl Cohen Zedek Latzer Baratz LLP

(57) ABSTRACT

The invention relates to a fuel cell arrangement (1) and a motor vehicle having a fuel cell arrangement (1). In order to be able to produce the fuel cell arrangement (1) in a compact manner and to be able to operate said fuel cell arrangement in an efficient manner, it is provided in accordance with the invention that an exhaust gas flow path (3a) of the fuel cell arrangement (1) extends through a jet pump (4).

12 Claims, 7 Drawing Sheets

(56) References Cited

U.S. PATENT DOCUMENTS

| | | | |
|---|---|---|---|
| 2009/0226780 A1* | 9/2009 | Fischer | B01D 53/864 |
| | | | 429/532 |
| 2009/0233133 A1* | 9/2009 | Lee | H01M 8/04141 |
| | | | 429/413 |
| 2010/0279191 A1 | 11/2010 | Matsuura et al. | |
| 2011/0008692 A1 | 1/2011 | Knoop | |

\* cited by examiner

FUEL CELL ASSEMBLY WITH JET PUMP IN THE EXHAUST PATH, AND MOTOR VEHICLE WITH FUEL CELL ASSEMBLY

CROSS REFERENCE TO RELATED APPLICATION

This application claims priority from German Patent Application No. DE 10 2014 219 836.4, filed Sep. 30, 2014, which is incorporated herein in its entirety.

FIELD OF THE INVENTION

The invention relates to a fuel cell arrangement having a fuel cell, wherein the fuel cell arrangement comprises an exhaust gas flow path for exhaust gases of the fuel cell. Furthermore, the invention relates to a motor vehicle having a fuel cell arrangement and a drive system that is connected to the fuel cell arrangement in such a manner that it transmits the driving energy.

BACKGROUND OF THE INVENTION

Fuel cells use the chemical conversion of a fuel that comprises oxygen in order to generate electrical energy. For this purpose, fuel cells comprise as core components the so-called membrane electrode assembly or membrane electrode unit (MEA=membrane electrode assembly) that can be embodied as a combination of the membrane that conducts ions, in particular protons, and respectively an electrode (anode and cathode) that is arranged on both sides of the membrane. The active material can comprise a catalyst or can be a catalyst that promotes the chemical conversion. In addition, gas diffusion layers can be arranged on both sides of the membrane electrode assembly on the faces of the electrode that are remote from the membrane. The fuel cell comprises at least one membrane electrode assembly or a plurality of membrane electrode assemblies that can be arranged in a fuel cell stack, wherein the power outputs of multiple membrane electrode assemblies are summated. During the operation of the fuel cell, an operating medium, by way of example the fuel, in particular hydrogen ($H_2$) or a gas mixture comprising hydrogen, is supplied to the anode where an electrochemical oxidation of $H_2$ to $H^+$ takes place whilst discharging electrons. The protons $H^+$ are transported out of the anode chamber into the cathode chamber in a water-bound or water-free manner by way of the membrane that electrically insulates and separates the reaction chambers of the fuel cell one from the other in a gas-tight manner. The electrons that are provided at the anode are conducted by way of an electrical line to the cathode. A further operating medium possibly oxygen ($O_2$) or a gas mixture comprising oxygen is supplied to the cathode so that $O_2$ is reduced to $O^{2-}$ whilst absorbing the electrons. These oxygen anions react simultaneously in the cathode chamber with the protons that are being transported by way of the membrane whilst forming water. By virtue of the direct conversion of chemical energy into electrical energy, fuel cells achieve an improved level of efficiency in comparison to other electrical generators by avoiding the Carnot factor.

In order to prevent that hydrogen collects in undesired concentrations in a housing of the fuel cell, housings of known fuel cells are ventilated with the aid of a ventilator. Furthermore, if the fuel cell is not operating, hydrogen can collect between the anode side and the cathode side of the membrane electrode assembly as a result of a connection that is conducting gas. If the fuel cell is brought back into operation, said fuel cell is flushed out on the cathode side so that in turn undesired hydrogen concentrations can be contained in the cathode gas that has been flushed out. These concentrations are reduced in the case of known fuel cells by adding a diluting gas, in particular air, wherein the diluting gas is supplied by means of additional gas supply lines to the gas that is to be diluted. By way of example, a fan is also required to transport the diluting gas. The known methods for preventing undesired high hydrogen concentrations are however costly and require installation space. Furthermore, energy is required at least to operate the ventilator and this constitutes an additional electric consumption.

The object of the invention is to provide a fuel cell arrangement that can be constructed and operated as small as possible and in a simple manner as possible.

SUMMARY OF THE INVENTION

The object is achieved for the fuel cell arrangement mentioned in the introduction by virtue of the fact that the fuel cell arrangement contains or rather comprises a jet pump that comprises a driving media inlet and an outlet, wherein the exhaust gas flow path extends from the driving media inlet as far as the outlet through the jet pump. The object is achieved for the motor vehicle mentioned in the introduction by virtue of the fact that the fuel cell arrangement of said motor vehicle is a fuel cell arrangement in accordance with the invention.

If exhaust gas from the fuel cell flows at least in part through the jet pump, said flow of exhaust gas generates a pumping effect without the electrical energy that is required for this purpose requiring an additional fan. Since it is not necessary to use electrical energy to operate the jet pump, it is not necessary to provide electrical lines for the jet pump, as a result of which installation space for the electrical lines is not required.

The solution in accordance with the invention can be further improved by virtue of various embodiments that are in themselves advantageous and, unless otherwise designed, can be combined as desired with one another. These embodiments and their associated advantages will be described hereinunder.

It is thus possible for the exhaust gas flow path to be the cathode-side exhaust gas flow path or the anode-side exhaust gas flow path of the fuel cell. The flushing gas path can extend at least in part through the exhaust gas flow path. The fuel cell arrangement can therefore be embodied in a flexible manner and tailored to suit the spatial conditions or other requirements.

In order to be able to improve the extent to which the construction of the fuel cell arrangement is tailored to suit spatial or other conditions, the outlet of the jet pump can be connected in a fluid-flow manner to an exhaust gas processing unit, in particular a cathode exhaust gas processing unit, of the fuel cell arrangement or to the cathode gas exhaust gas flow path of the fuel cell arrangement. In particular, if the anode exhaust gas flow path extends through the jet pump, the outlet can be connected to the cathode gas exhaust gas flow path, wherein the cathode-gas exhaust gas flow path can lead to the exhaust gas processing unit of the fuel cell arrangement. Additional exhaust gas processing units are therefore not required so that the installation space required by the fuel cell arrangement is further reduced.

In order to remove the gas that is contained in the housing and consequently to be able to flush or rather ventilate the housing, a suction media connection of the jet pump can be connected in a fluid-flow manner to the housing in which the fuel cell is arranged. During the operation, the jet pump generates a vacuum so that a fluid and in particular a gas can be drawn in through the suction media connection and consequently transported.

As an alternative or in addition thereto, the suction media connection of the jet pump can be connected in a fluid-flow manner to the surroundings of the fuel cell arrangement. During the operation, the jet pump draws in air from the environment in order to dilute the exhaust gas of the fuel cell and in particular in order to be able to reduce the amount of hydrogen in the exhaust gas.

The exhaust gas flow path of the fuel cell arrangement can comprise a branch for product water. By way of example, the branch can discharge separated product water. In particular, the branch for the product water can be the branch that extends through the jet pump. The product water that is flowing through the jet pump and where possible is in a fluid form generates a greater pumping effect than a gaseous pumping medium, by way of example a product water that is in the form of a gas or vapor.

Another branch of the exhaust gas flow path can be connected in parallel to the branch for the product water in order to be able to discharge exhaust gas of the fuel cell without product water. The other branch can extend through a turbine, wherein the exhaust gas that is flowing through the other branch can drive the turbine and consequently generate electrical energy. The two branches of the exhaust gas flow path can be rejoined upstream of an exhaust gas processing unit so that only one exhaust gas processing unit is required. Alternatively, after the product water has exited the jet pump, said product water can be discharged by means of the outlet of said jet pump in a simple manner and with a small outlay into the environment or to further devices of the fuel cell arrangement.

A valve, by way of example a stop valve or a control valve or a stop flap or control flap, can be connected upstream of the driving media inlet. As a consequence, the jet pump can be used in a purposeful manner. If the pumping effect of the jet pump is not required, then the exhaust gas can be conducted past said jet pump, by way of example along the other branch of the exhaust gas flow path, in order to drive the turbine.

It is possible to connect a valve, by way of example a non-return valve, upstream of the suction media connection so that fluid can only be drawn in by means of the jet pump when said jet pump is operating. If the valve is closed and the non-return valve is by way of example in an idle position, then gas cannot flow away from the jet pump through the suction media connection or pass through the suction media connection in an undesired manner into the jet pump.

BRIEF DESCRIPTION OF THE DRAWINGS

The invention is explained hereinunder in the exemplary embodiments with reference to the associated drawings, in which.

DETAILED DESCRIPTION OF THE INVENTION

The invention is explained hereinunder with reference to embodiments with the aid of the drawings. The different features of the embodiments can be combined independently from each other as has already been explained with reference to the individual advantageous developments.

Figure 1:
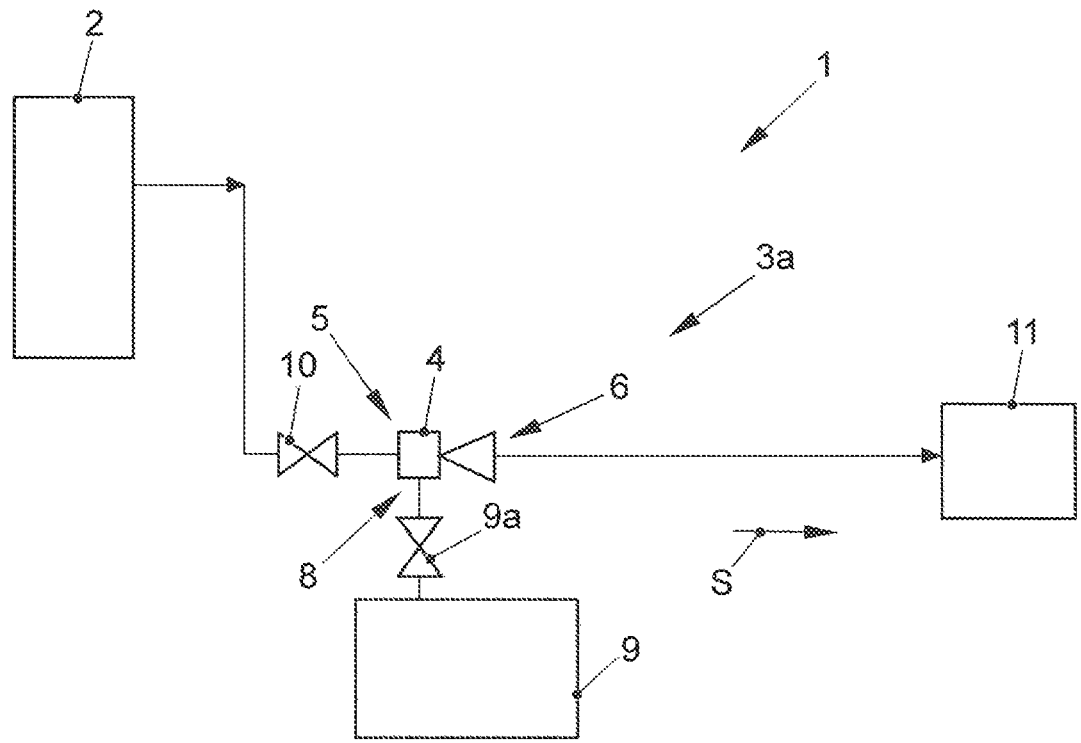
FIGS. 1 to 6 illustrate exemplary embodiments of the fuel cell arrangement in accordance with the invention having a jet pump arranged in the cathode-side exhaust gas flow path.

In the first instance, the design and function of a fuel cell arrangement in accordance with the invention is described with the aid of the exemplary embodiment illustrated in FIG. 1.

FIG. 1 illustrates a schematic view of the fuel cell arrangement 1 having a fuel cell 2 and an exhaust gas flow path. The exhaust gas flow path of the exemplary embodiment in FIG. 1 is a cathode exhaust gas flow path 3a that discharges cathode-side exhaust gas from the fuel cell 2.

The cathode exhaust gas flow path 3a extends through a jet pump 4, wherein the cathode exhaust gas flow path 3a extends along a flow direction S of the exhaust gas away from the fuel cell 2 initially through a driving media inlet 5 of the jet pump 4 and subsequently through an outlet 6 of the jet pump 4.

In the exemplary embodiment in FIG. 1, a suction media connection 8 of the jet pump 4 is connected in a fluid-flow manner to a fuel cell housing of the fuel cell 2 so that gas that is arranged in the fuel cell housing 9 can be drawn off with the aid of the jet pump 4. The fuel cell housing 9 is illustrated separately from the fuel cell 2 as a result of the schematic illustration in FIG. 1. Alternatively, the suction media connection can also be connected in a fluid-flow manner to the environment in order to draw in air from the environment and to conduct said air into the cathode exhaust gas flow path 3a.

It is possible to provide on the inlet-side of the jet pump 4, in other words between the fuel cell 2 and the jet pump 4, a valve by way of example a stop valve or a control valve, or a control flap or stop flap 10, wherein the exhaust gas flow path can flow through the valve or rather the flap 10 from the fuel cell 2 to the jet pump 4. If the valve or rather the flap 10 is closed, then exhaust gas cannot flow through the jet pump 4 so that the jet pump 4 does not have any suction power. If the valve or rather the flap 10 is at least in part open or even fully open, then during the operation of the fuel cell arrangement 1 exhaust gas from the fuel cell 2 can flow through the jet pump 4 and said jet pump can provide a vacuum at the suction media connection 8.

It is possible to connect an exhaust gas processing unit 11 of the jet pump 4 in the flow direction S of the exhaust gas downstream of the jet pump 4. In particular, the outlet 6 of the jet pump 4 can be connected in a fluid-flow manner to the exhaust gas processing unit 11.

It is possible to connect a valve 9a, by way of example a non-return valve, upstream of the suction media connection 8 so that fluid can only be drawn in by means of the jet pump 4 when said jet pump is operating. If the valve 9a is closed and the non-return valve is by way of example in an idle position, then gas cannot flow away from the jet pump 4 through the suction media connection 8 or pass through the suction media connection 8 in an undesired manner into the jet pump 4.

In the exemplary embodiment in FIG. 1, the pressure in the exhaust gas flow path is high in the flow direction S upstream of the jet pump 4, in other words between the fuel cell 2 and the jet pump 4, wherein this pressure is higher than a pressure in the exhaust gas flow path that extends on the outlet-side of the jet pump 4 between the jet pump 4 and the exhaust gas processing unit 11.

Figure 2:
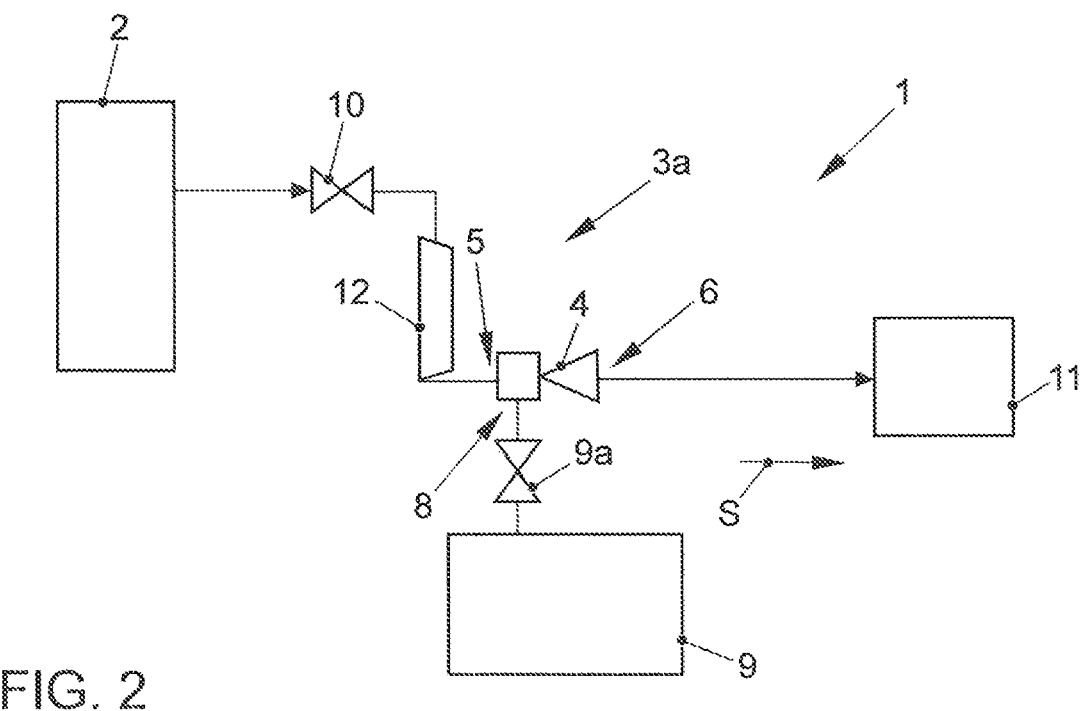

FIG. 2 illustrates a schematic view of a further exemplary embodiment of the fuel cell arrangement in accordance with the invention 1. The same reference numerals are used for elements whose function and/or construction correspond to the exemplary embodiment in FIG. 1. For the sake of brevity, only the differences with regard to the exemplary embodiment in FIG. 1 are mentioned hereinunder.

The fuel cell arrangement 1 of the exemplary embodiment in FIG. 2 comprises in addition a turbine 12 through which the exhaust gas flow path and in particular the cathode exhaust gas flow path 3*a* extends. The turbine 12 is preferably arranged between the fuel cell 2 and the jet pump 4 so that exhaust gas that is flowing out of the fuel cell 2 initially flows through the turbine 12 and subsequently through the jet pump 4. A section of the exhaust gas flow path that extends between the fuel cell 2 and the turbine 12 has a high pressure that is in turn higher than a pressure in the section of the exhaust gas flow path that is arranged on the outlet-side of the jet pump 4. The outlet-side section of the exhaust gas flow path commences in the flow direction S by way of example at the outlet 6 of the jet pump 4. A mean pressure that is between the high pressure and the low pressure prevails between the turbine 12 and the jet pump 4. The section of the exhaust gas flow path that has the mean pressure extends in other words preferably on the outlet-side of the turbine 12 as far as the driving media inlet 5 of the jet pump 4.

The valve or the flap 10 is arranged in the exemplary embodiment in FIG. 2 between the fuel cell 2 and the turbine 12. Alternatively, the valve or the flap 10 can also be provided between the turbine 12 and the jet pump 4. The exhaust gas processing unit 11 can also be connected downstream of the jet pump 4 in the exemplary embodiment in FIG. 2. The suction media connection 8 can in turn be connected in a fluid-flow manner to the fuel cell housing 9 or to the environment of the fuel cell arrangement 1.

Figure 3:
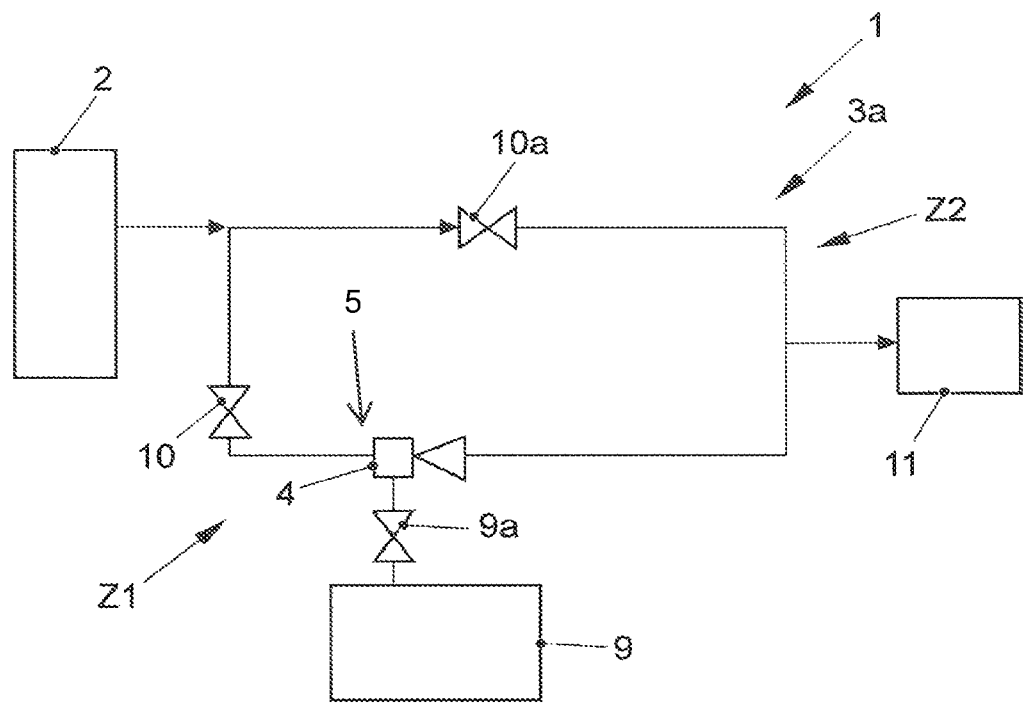

FIG. 3 illustrates a schematic view of a further exemplary embodiment of the fuel cell arrangement in accordance with the invention. The same reference numerals are used for elements whose function and/or construction correspond to the exemplary embodiments in FIG. 1 or 2. For the sake of brevity, only the differences with regard to the exemplary embodiment in FIGS. 1 and 2 are mentioned hereinunder.

The exhaust gas flow path that is also illustrated in the exemplary embodiment of FIG. 3 as a cathode exhaust gas flow path 3*a* can comprise multiple branches. By way of example, a first branch Z1 of the exhaust gas flow path can extend at least through the jet pump 4 and in addition also through the valve or the flap 10. Another or a second branch Z2 of the exhaust gas flow path can extend in parallel to the first branch Z1 and can be embodied as a circumvention or bypass branch. The exhaust gas can be discharged from the fuel cell 2 through the second branch Z2 and by way of example to the exhaust gas processing unit 11 if the exhaust gas is not to be conducted or is not to be fully conducted through the first branch Z1 and consequently through the jet pump 4. A further valve or rather a further flap 10*a* can be arranged along the second branch Z2, wherein it is possible using the valve or the flap 10*a* either to close the second branch Z2 or to open said second branch at least in part or even fully.

The two branches Z1, Z2 can be rejoined before the exhaust gas flow path is conducted to the exhaust gas processing unit 11, as a consequence of which the outlay with regard to the supply lines for the exhaust gas flow path is reduced.

Figure 4:
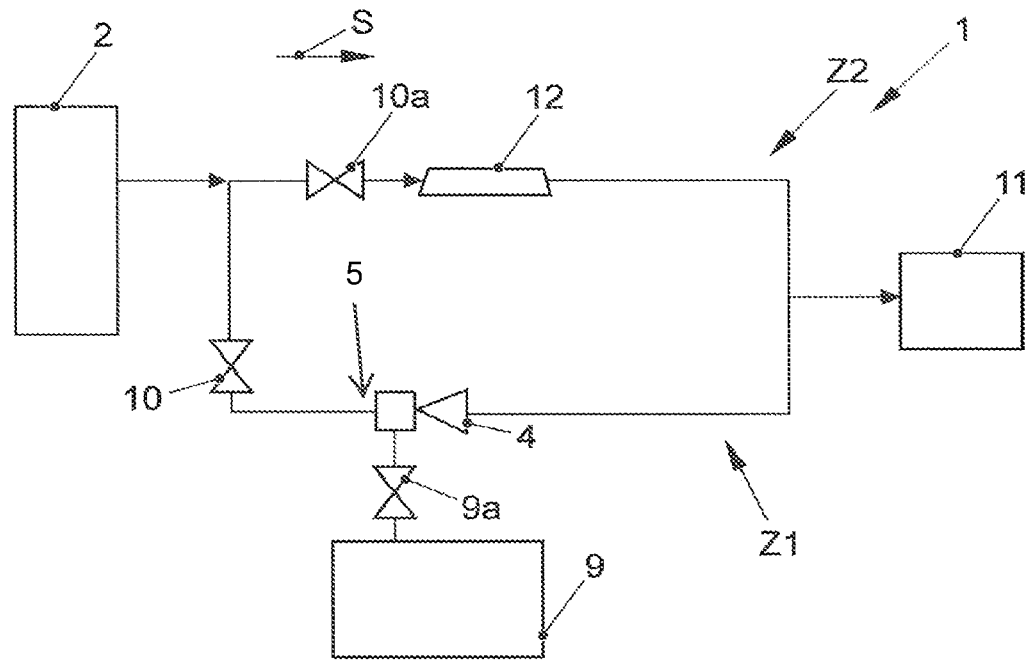

FIG. 4 illustrates a further exemplary embodiment of the fuel cell arrangement in accordance with the invention 1. The same reference numerals are used hereinunder for elements whose function and/or construction correspond to the exemplary embodiments in FIGS. 1 to 3. For the sake of brevity, only the differences with regard to the exemplary embodiment in FIG. 3 are mentioned.

In addition, the fuel cell arrangement 1 of the exemplary embodiment of FIG. 4 comprises the turbine 12, wherein the turbine 12 is not arranged with the jet pump 4 in the first branch Z1 of the exhaust gas flow path but rather in the second branch Z2 of the exhaust gas flow path. In particular, the turbine 12 is arranged along the flow direction S downstream of the valve or the flap 10*a*. Alternatively, the valve or the flap 10*a* can be arranged in the flow direction S downstream of the turbine 12 and before the two branches Z1, Z2 are joined together. If the valves or the flaps 10, 10*a* are embodied so that they open or close the branches Z1, Z2 as desired, the entire exhaust gas that is discharged from the fuel cell 2, in particular the cathode-side and/or the anode-side exhaust gas, can be conducted through the jet pump 4 or through the turbine 12 as desired. However, if the valves 10, 10*a* are embodied as control valves, then the exhaust gas can be conducted at least in part both through the turbine 12 and also through the jet pump 4.

Figure 5A:
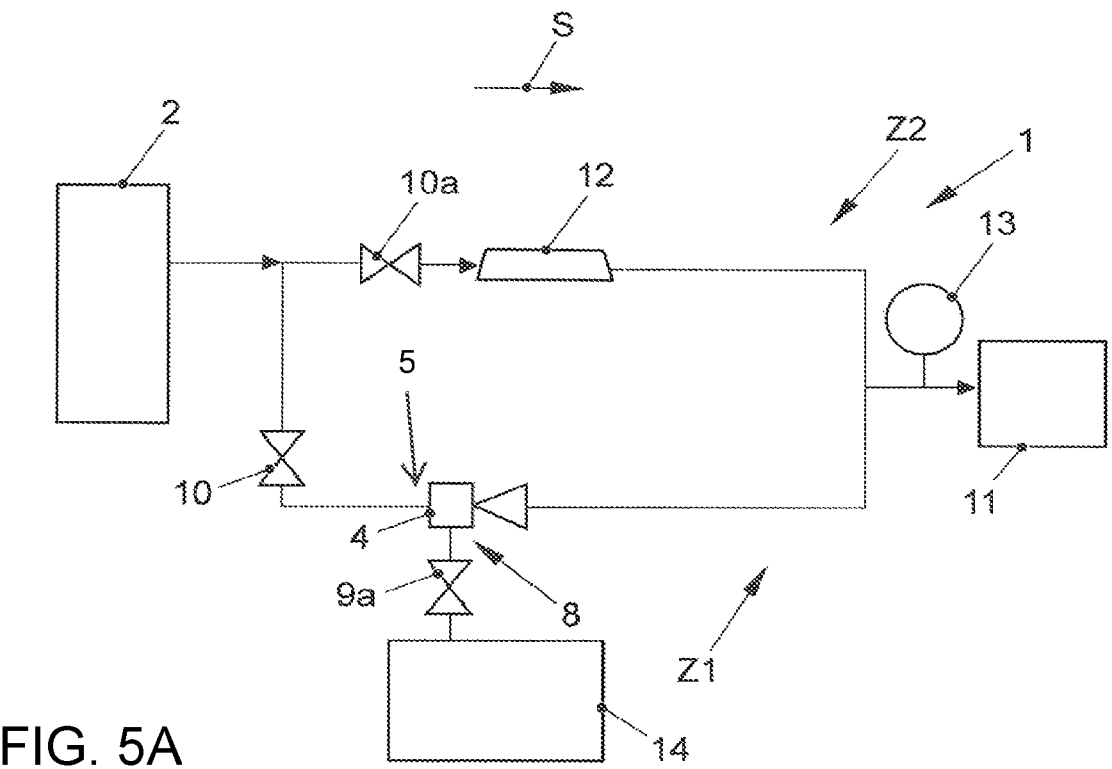

FIG. 5A illustrates a schematic view of a further exemplary embodiment of the fuel cell in accordance with the invention 1. The same reference numerals are used for elements whose function and/or construction correspond to the exemplary embodiments in FIGS. 1 to 4. For the sake of brevity, only the differences with regard to the exemplary embodiment in FIG. 4 are mentioned hereinunder.

Figure 5B:
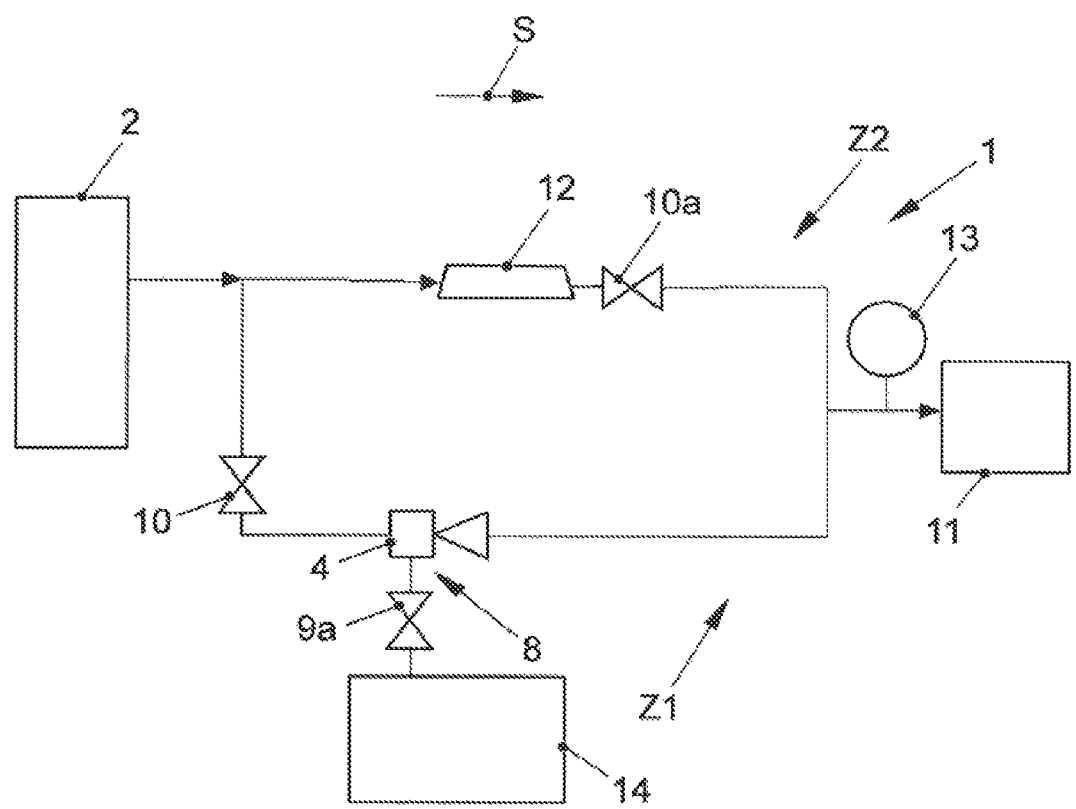

The fuel cell arrangement 1 of the exemplary embodiment in FIG. 5A comprises in addition a hydrogen sensor 13 that is connected in the flow direction S downstream of the turbine 12. The hydrogen concentration in the exhaust gas can be ascertained using the hydrogen sensor 13. By way of example, the hydrogen sensor can be connected upstream of the exhaust gas processing unit 11. In particular, the hydrogen sensor 13 is connected in the flow direction S downstream of the two branches Z1, Z2 of the exhaust gas flow path. By way of example, the two branches Z1, Z2 can be rejoined before the exhaust gas flow path leads in the flow direction S to the hydrogen sensor 13. Alternatively, as shown in FIG. 5B, the valve or the flap 10*a* can be arranged in the flow direction S downstream of the turbine 12 and before the two branches Z1, Z2 are joined together.

If the hydrogen concentration in the exhaust gas is greater than a predetermined value, said hydrogen concentration can be ascertained using the hydrogen sensor 13. The hydrogen sensor 13 can generate a sensor signal that represents the hydrogen concentration in the exhaust gas and that can be conducted to the control unit of the fuel cell arrangement 1. The control unit can be connected to the valves or rather flaps 10, 10*a* in such a manner that it can transmit the control signal so that, independent upon the hydrogen concentration in the exhaust gas, the exhaust gas can be conducted through the first branch Z1 or through the second branch Z2. The exhaust can be conducted either only through the first branch Z1 or only through the second branch Z2 or in each case in part through the two branches Z1, Z2. In the exemplary embodiment in FIG. 5, the hydrogen sensor 13 measures the hydrogen concentration of the exhaust gas of the fuel cell. The exemplary embodiments in FIGS. 3 and 6 and also the exemplary embodiments in FIGS. 1, 2, and 5 can also be embodied in a corresponding manner and in particular can be provided with a hydrogen sensor 13. As an alternative or in addition thereto, the hydrogen sensor 13 or a further hydrogen sensor can determine the hydrogen concentration in the fuel cell housing 9 and the valves or rather the flaps 10, 10a can be controlled in such a manner that the fuel cell housing 9 is ventilated with the aid of the jet pump 4.

In the exemplary embodiment in FIG. 5A, the suction media connection 8 of the jet pump 4 is however not connected in a fluid-flow manner to the fuel cell housing 10. On the contrary, the suction media connection 8 is by way of example connected in a fluid flow manner to the environment of the fuel cell arrangement 1, by way of example an engine compartment of a motor vehicle that comprises the fuel cell arrangement 1. This is also possible for the exemplary embodiments in the remaining figures. If gas is drawn off from the fuel cell housing 10, this gas can at least in part comprise air from the environment so that, always when gas is drawn off from the fuel cell housing 10, air from the environment can automatically be drawn off together with the gas. As a consequence, during the operation of the jet pump 4, said jet pump can draw in air from the environment so as to dilute the exhaust gas if the hydrogen concentration in the exhaust gas is above a predetermined value.

Figure 6:
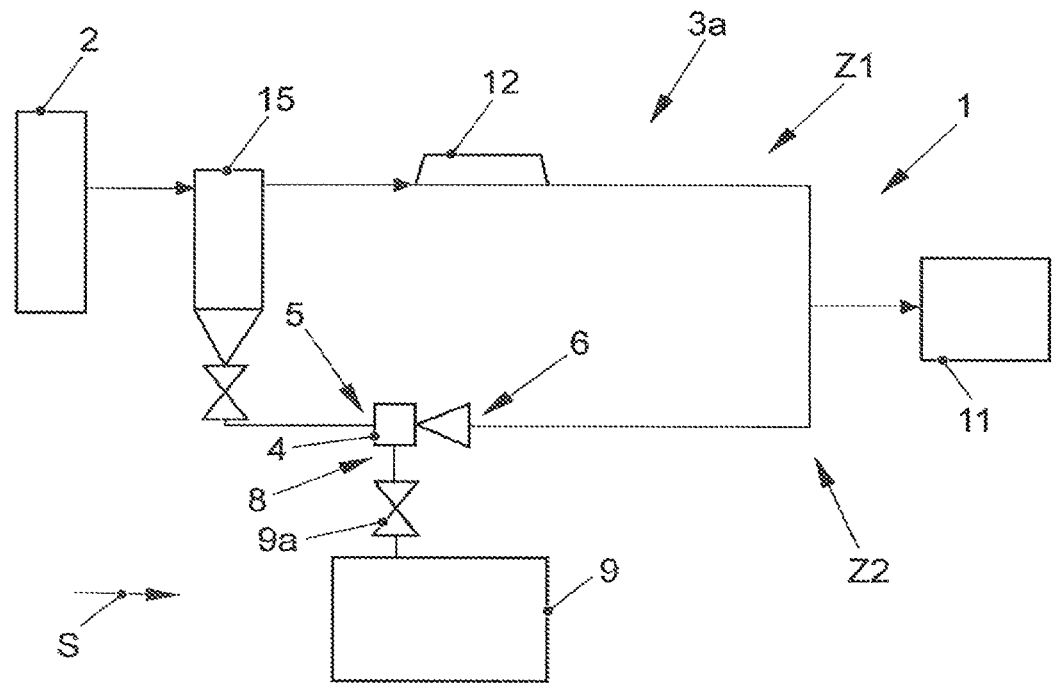

FIG. 6 illustrates a further exemplary embodiment of the fuel cell arrangement in accordance with the invention 1. The same reference numerals are used for elements whose function and/or construction correspond to the previous figures. For the sake of brevity, only the differences with regard to the exemplary embodiment in FIG. 5 are mentioned.

The fuel cell arrangement 1 of the exemplary embodiment in FIG. 6 comprises a water separator 15 in order to be able to separate out any product water that is contained in the exhaust gas and in particular in the cathode exhaust gas of the fuel cell 2. The exhaust gas flow path and in particular the cathode exhaust gas flow path 3a can extend between the fuel cell 2 and the turbine 12 through the water separator 15 so that less or even no product water or at least little or no fluid product water can be transported with the exhaust gas to the turbine 12. The water separator 15 is preferably connected to the second branch Z2 on the outlet-side of a water outlet of the water separator 15 so that the jet pump 4 can follow the water separator 15 directly or indirectly along the flow direction S. The valve or rather the flap 10 is still arranged in the exemplary embodiment in FIG. 6 between the water separator 15 and the jet pump 4. The valve or rather the flap 10a is not illustrated in the exemplary embodiment in FIG. 6. However, optionally, the valve or rather the flap 10a can be provided between a gas outlet of the water separator 15 and the turbine 12 that is connected downstream of the gas outlet or said valve can even be provided downstream of the turbine 12 in the first branch Z1. If separated product water flows from the driving media inlet 5 to the outlet 6 through the jet pump 4, then the jet pump 4 generates in an efficient manner a vacuum at the suction media connection 8. The suction media connection 8 of the exemplary embodiment in FIG. 6 is connected in a fluid-flow manner to the fuel cell housing in order to be able to ventilate said fuel cell housing as required. Alternatively, the suction media connection 8 can be connected in a fluid-flow manner to the environment.

The fuel cell arrangement 1 of the exemplary embodiment in FIG. 6 can ventilate the fuel cell housing 9 and in so doing simultaneously generate electrical energy using the turbine 12, since the separated product water can be simultaneously used to pump away the gas in the fuel cell housing 9 and the remaining exhaust gas in order to generate electrical energy using the turbine 12.

Figure 7:
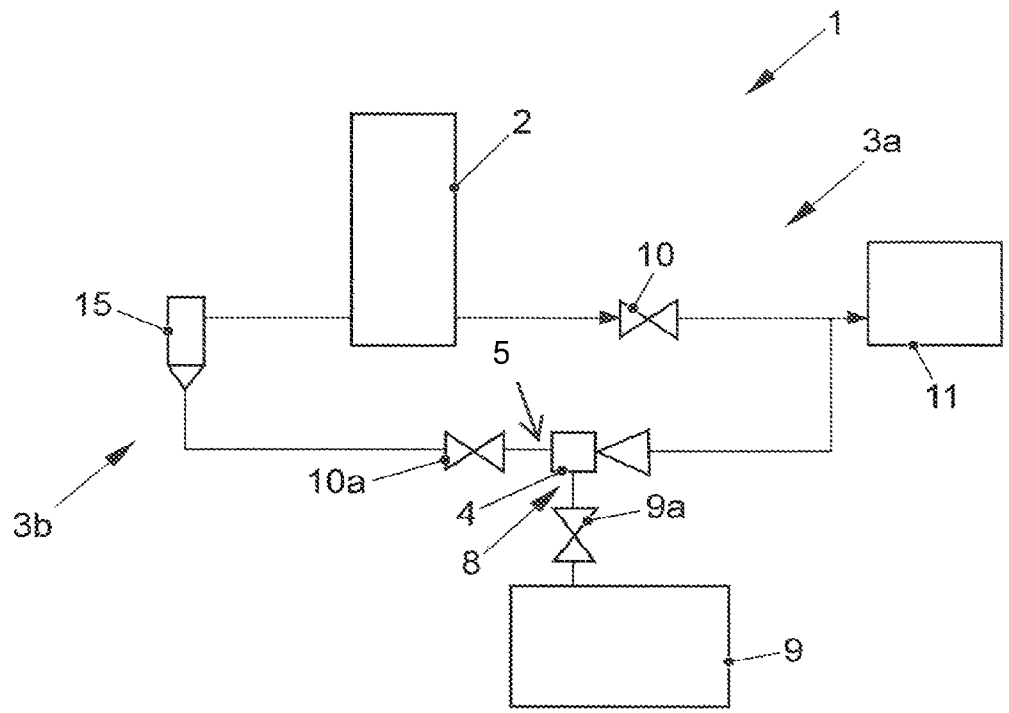
FIGS. 7 and 8 illustrate exemplary embodiments of the fuel cell arrangement in accordance with the invention having a jet pump arranged in the anode-side exhaust gas flow path.

FIG. 7 illustrates a further exemplary embodiment of the fuel cell arrangement in accordance with the invention 1. The same reference numerals are used for elements whose function and/or construction correspond to the exemplary embodiments in previous figures. For the sake of brevity, only the differences with regard to exemplary embodiments in the previous figures are mentioned.

The fuel cell arrangement 1 of the exemplary embodiment in FIG. 7 is illustrated with the cathode exhaust gas flow path 3a and an anode exhaust gas flow path 3b. The cathode exhaust gas flow path 3a extends from the fuel cell 2 through the optional valve or rather the optional flap 10 to the exhaust gas processing unit 11. A higher pressure can prevail between the fuel cell 2 and the valve or rather the flap 10 in the cathode exhaust gas flow path 3a than between the valve or rather the flap 10 of the exhaust gas processing unit 11.

The anode exhaust gas flow path 3b extends from the fuel cell 2 on the anode side through the jet pump 4 to the exhaust gas processing unit 11. The cathode exhaust gas flow path 3a and the anode exhaust gas flow path 3b are joined together upstream of the exhaust gas processing unit 11. The valve or rather the flap 10a can be arranged between the fuel cell 2 and the jet pump 4 so that anode-side exhaust gas can be conducted from the fuel cell 2 as desired to the jet pump 4. The jet pump 4 is connected in the exemplary embodiment in FIG. 7 on the suction media connection-side to the fuel cell housing 9. Alternatively, the suction media connection 8 can also be connected in a fluid-flow manner to the environment of the fuel-cell arrangement 1.

The anode exhaust gas flow path 3b can extend through the water separator 15 so that anode-side product water can be separated out from the anode-side exhaust gas and where possible can be conducted through the valve or rather through the flap 10a to the jet pump 4. Anode exhaust gas from which the product water has been removed using the water separator 15 can be discharged through a further branch of the anode exhaust gas flow path 3b and conducted by way of example to the exhaust gas processing unit 11, said further branch is however for the sake of simplicity not illustrated in FIG. 7. The branch can be an outlet of the water separator 15 through which essentially no product water discharges.

Figure 8:
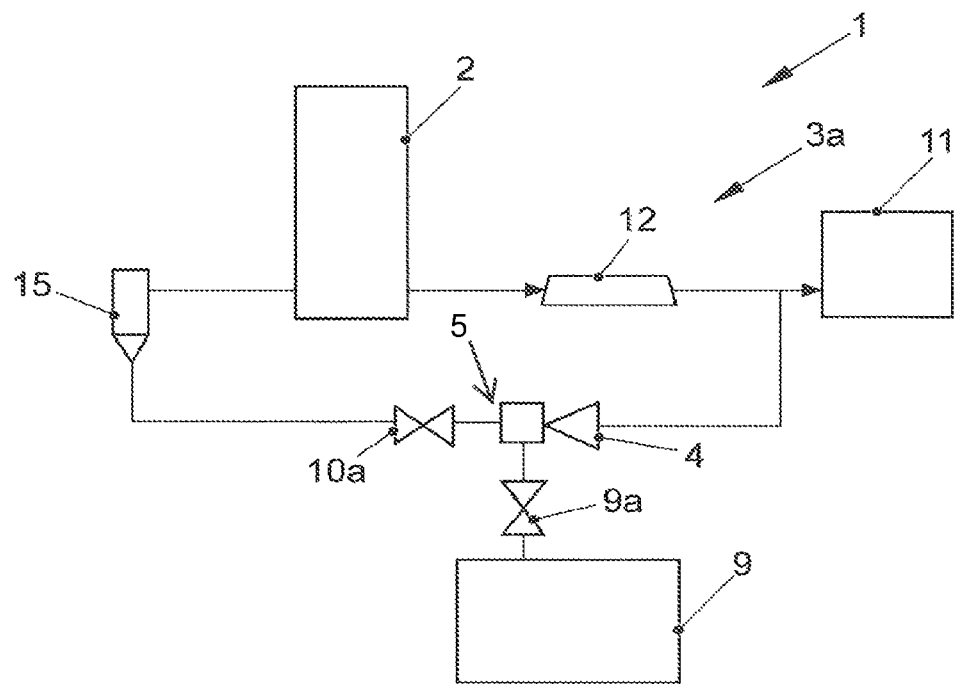

FIG. 8 illustrates a further exemplary embodiment of the fuel cell arrangement in accordance with the invention 1. The same reference numerals are used for elements whose function and/or construction correspond to the exemplary embodiments in previous figures. For the sake of brevity, only differences with regard to the exemplary embodiment in FIG. 7 are mentioned.

The fuel cell arrangement 1 of the exemplary embodiment in FIG. 8 comprises the turbine 12 through which the cathode exhaust gas flow path 3a extends. In particular, the turbine 12 can be arranged between the fuel cell 2 and the exhaust gas processing unit 11 so that cathode exhaust gas that has been discharged from the fuel cell 2 can flow through the turbine 12 on its way to the exhaust gas processing unit 11. Optionally, the valve or the flap 10 can be provided between the fuel cell 2 and the turbine 12, wherein the valve or the flap 10 are not illustrated in FIG. 8 for the sake of simplicity. Alternatively, the valve or the flap 10 can be arranged downstream of the turbine 12.

Figure 9:
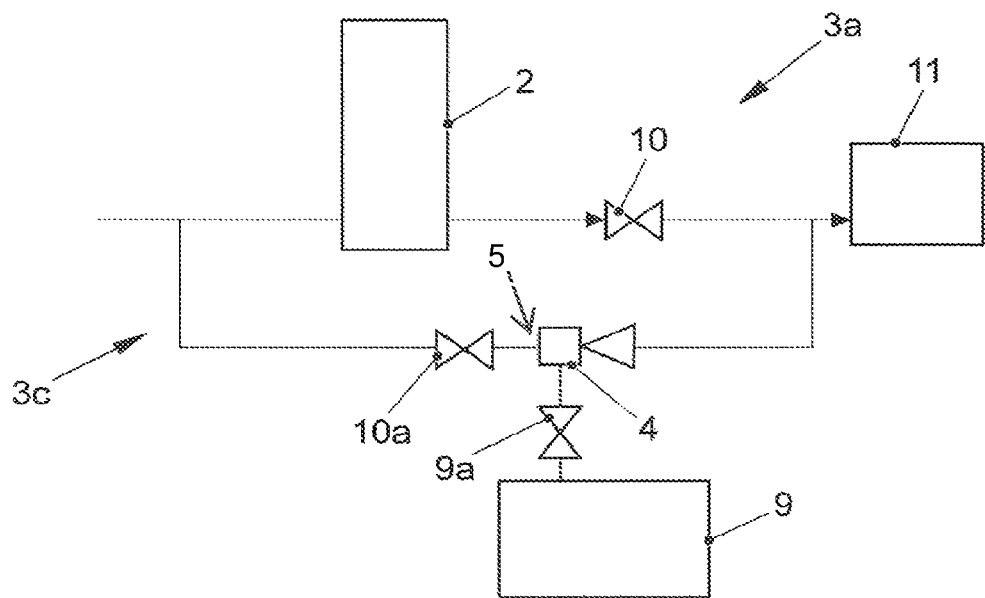
FIGS. 9 and 10 illustrate exemplary embodiments of the fuel cell arrangement in accordance with the invention with the anode-side exhaust gas flow path extending through the jet pump.

FIG. 9 illustrates a further exemplary embodiment of the fuel cell arrangement in accordance with the invention 1. The same reference numerals are used hereinunder for elements whose function and/or construction correspond to the previous exemplary embodiments. For the sake of brevity, only differences with regard to the exemplary embodiment in FIG. 7 are mentioned.

In contrast to the exemplary embodiment in FIG. 7, the anode exhaust gas flow path 3b in the exemplary embodiment in FIG. 9 extends through the jet pump 4. The anode exhaust gas flow path 3b can extend on the anode side through the fuel cell 2 and in particular on the outlet side of the fuel cell 2, in other words after flowing through the fuel cell 2, through the jet pump 4. By way of example, the anode exhaust gas flow path 3b can extend on the outlet side of the fuel cell 2 to the jet pump 4 and/or at least in part or as desired back to the fuel cell 2.

Figure 10:
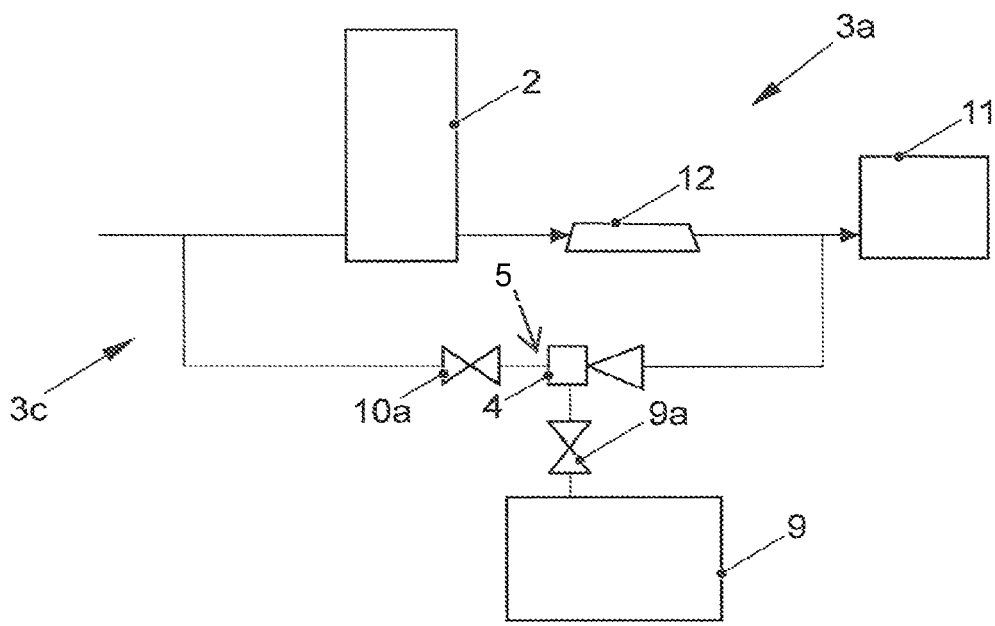

FIG. 10 illustrates a further exemplary embodiment of the fuel cell arrangement in accordance with the invention 1. The same reference numerals are used for elements whose function and/or construction correspond to previous exemplary embodiments. For the sake of brevity, only differences with regard to the exemplary embodiment in FIG. 9 are mentioned.

The fuel cell arrangement 1 of the exemplary embodiment in FIG. 10 comprises the turbine 12 through which the cathode exhaust gas flow path 3a extends. In particular, the turbine 12 can be arranged between the fuel cell 2 and the exhaust gas processing unit 11 so that cathode exhaust gas that has been discharged from the fuel cell 2 can flow through the turbine 12 on its way to the exhaust gas processing unit 11. Optionally, the valve or the flap 10 can be provided between the fuel cell 2 and the turbine 12, wherein the valve or the flap 10 are not illustrated in FIG. 10 for the sake of simplicity. Alternatively, the valve or the flap 10 can also be arranged downstream of the turbine 12.

The exhaust gas flow path of the exemplary embodiments illustrated in the previous figures can be either the cathode exhaust gas flow path 3a or the anode exhaust gas flow path 3b. In particular, the anode exhaust gas flow path 3b can branch and lead at least in part and/or as desired back to the fuel cell 2.

Figure 11:
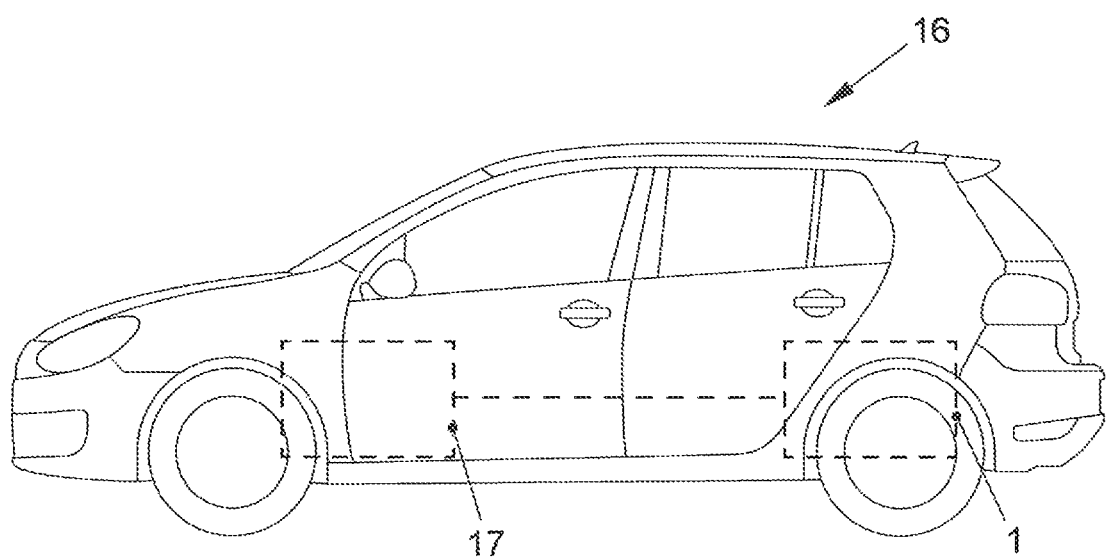
FIG. 11 illustrates an exemplary embodiment of a motor vehicle in accordance with the invention.

FIG. 11 illustrates an exemplary embodiment of the motor vehicle in accordance with the invention 16 having a fuel cell arrangement 1 in accordance with one of the exemplary embodiments illustrated in the previous figures. The motor vehicle 16 comprises a drive system 17 for driving the motor vehicle 16, wherein the drive system 17 is connected to the fuel cell arrangement 1 in such a manner that it transmits the driving energy. During the operation of the motor vehicle 16, the fuel cell arrangement 1 can therefore supply the drive system 17 of said motor vehicle with at least part or even with all the driving energy required. Alternatively, the suction media connection can also be connected in a fluid-flow manner to the environment in order to draw in air from the environment and to conduct said air into the cathode exhaust gas flow path 3a.

LIST OF REFERENCE NUMERALS

1 Fuel cell arrangement
2 Fuel cell
3a Cathode exhaust gas flow path
3b Anode exhaust gas flow path
3c Flushing gas flow path
4 Jet pump
5 Driving media inlet
6 Outlet
7 Suction media connection
8 Fuel cell housing
9a Valve
10,10a Valve/Flap
11 Exhaust gas processing unit
12 Turbine
13 Hydrogen sensor
14 Environment
15 Water separator
16 Motor vehicle
17 Drive system
S Flow direction
Z1 First branch of the exhaust gas flow path
Z2 Second branch of the exhaust gas flow path

The invention claimed is:

1. A fuel cell arrangement comprising:
a fuel cell;
an exhaust gas flow path for exhaust gases of the fuel cell having a first branch connected in parallel to a second branch;
a jet pump arranged downstream from the fuel cell in the first branch of the exhaust gas flow path, wherein the jet pump comprises a driving media inlet and an outlet; and
a turbine arranged downstream from the fuel cell in the second branch of the exhaust gas flow path;
wherein the first branch of the exhaust gas flow path and the second branch of the exhaust flow path rejoin downstream from the outlet and the turbine, and
wherein a flow direction of the exhaust gas flow path through the first and second branches and after the first and second branches rejoin is away from the fuel cell.

2. The fuel cell arrangement as claimed in claim 1, wherein the exhaust gas flow path is the cathode-side exhaust gas flow path or the anode-side exhaust gas flow path of the fuel cell.

3. The fuel cell arrangement as claimed in claim 1, wherein the outlet and the turbine are connected in a fluid-flow manner to an exhaust gas processing unit of the fuel cell arrangement.

4. The fuel cell arrangement as claimed in claim 1, wherein the exhaust gas flow path is the anode-side exhaust gas flow path of the fuel cell and the outlet is connected in a fluid-flow manner to a cathode exhaust gas flow path of the fuel cell arrangement.

5. The fuel cell arrangement as claimed in claim 1, wherein a suction media connection of the jet pump is connected in a fluid-flow manner to a housing in which the fuel cell is arranged.

6. The fuel cell arrangement as claimed in claim 1, wherein a suction media connection of the jet pump is connected in a fluid-flow manner to the environment of the fuel cell arrangement.

7. The fuel cell arrangement as claimed in claim 1, wherein the exhaust gas flow path comprises a branch for product water and said branch is the branch for product water that extends through the jet pump.

8. The fuel cell arrangement as claimed in claim 1, wherein a valve or a flap is connected upstream of the driving media inlet.

9. The fuel cell arrangement as claimed in claim 5, wherein a valve is connected upstream of the suction media connection.

10. A motor vehicle having a fuel cell arrangement and a drive system that is connected to the fuel cell arrangement in such a manner that it transmits the driving energy, wherein the fuel cell arrangement is a fuel cell arrangement as claimed in claim 1.

11. The fuel cell arrangement as claimed in claim 1, a hydrogen sensor connected downstream from the first branch and the second branch of the exhaust gas flow path.

12. The fuel cell arrangement as claimed in claim 1, comprising a valve arranged downstream of the turbine in the second branch of the exhaust gas flow path.

* * * * *